United States Patent
Sammt et al.

(10) Patent No.: US 6,893,608 B2
(45) Date of Patent: May 17, 2005

(54) STEEL FOR PLASTIC MOLDS AND PROCESS FOR THEIR HEAT TREATMENT

(75) Inventors: Klaus Sammt, Zeltweg (AT); Johann Sammer, Leoben (AT); Gerhard Lichtenegger, Kapfenberg (AT)

(73) Assignee: Boehler Edelstahl GmbH, Kapfenberg (AT)

( * ) Notice: Subject to any disclaimer, the term of this patent is extended or adjusted under 35 U.S.C. 154(b) by 249 days.

(21) Appl. No.: 10/073,233

(22) Filed: Feb. 13, 2002

(65) Prior Publication Data

US 2002/0162614 A1 Nov. 7, 2002

(30) Foreign Application Priority Data

Feb. 14, 2001 (AT) ............................................. 230/2001

(51) Int. Cl.⁷ ............................ C21D 1/25; C21D 1/26; C21D 1/32; C22C 38/02; C22C 38/20
(52) U.S. Cl. ........................... 420/42; 420/88; 148/607; 148/608
(58) Field of Search ............................. 420/42, 88, 34; 148/607, 608

(56) References Cited

U.S. PATENT DOCUMENTS

| | | | |
|---|---|---|---|
| 3,401,035 A | 9/1968 | Moskowitz et al. | |
| 3,767,390 A | * 10/1973 | Hahn | ........................ 75/128 G |
| 4,594,115 A | * 6/1986 | Lacoude et al. | ............. 148/542 |
| 6,045,633 A | 4/2000 | Henn et al. | |
| 6,146,475 A | 11/2000 | Kosa | |
| 6,358,334 B2 | 3/2002 | Henn et al. | |
| 2002/0088513 A1 | 7/2002 | Henn et al. | |

FOREIGN PATENT DOCUMENTS

| | | |
|---|---|---|
| EP | 0170598 | 2/1986 |
| EP | 0508574 | 10/1992 |
| JP | 2000160297 | 6/2000 |
| WO | 99/36584 | 7/1999 |

OTHER PUBLICATIONS

English Language Abstract of EP 0 170 598.
Patent Abstracts of Japan, vol. 2000, No. 09, Oct. 13, 2000.

* cited by examiner

Primary Examiner—Daniel Jenkins
(74) Attorney, Agent, or Firm—Greenblum & Bernstein, P.L.C.

(57) ABSTRACT

Maraging steel with improved machinability, good weldability, and high corrosion resistance, a process for the heat treatment of such a steel, as well as its use. According to the invention this steel contains (in % by weight) 0.02–0.075% carbon; 0.1–0.6% silicon; 0.5–0.9% manganese; 0.08–0.25% sulfur; maximum 0.04%; phosphorus; 12.4–15.2% chromium; 0.05–1.0% molybdenum; 0.2–1.8% nickel; maximum 0.15% vanadium; 0.1–0.45% copper; maximum 0.03% aluminum; 0.02–0.08% nitrogen; as well as optionally one or more additional alloying elements up to maximum 2.0%, residual iron, and impurities caused in manufacturing, and a ferrite percentage in the structure of less than 28% by volume. A process is also provided for the heat treatment of a maraging steel with improved machinability, which process makes an object that is through-hardened even with a large cross-section, lies essentially in that a steel block with the above composition is subjected in a first step to an annealing treatment for the formation and adjustment of a ferrite percentage in the structure and in a second step a hot forming of the same takes place, after which in a third step a soft annealing and then a thermal tempering are performed.

32 Claims, 1 Drawing Sheet

STEEL FOR PLASTIC MOLDS AND PROCESS FOR THEIR HEAT TREATMENT

CROSS REFERENCE TO RELATED APPLICATIONS

The present application claims priority under 35 U.S.C. §119 of Austrian Patent Application No. 230/2001, filed on Feb. 14, 2001, the disclosure of which is expressly incorporated by reference herein in its entirety.

BACKGROUND OF THE INVENTION

1. Field of the Invention

The present invention relates to a maraging steel with improved machinability, good weldability, and high corrosion resistance, and to its use. Furthermore, the invention includes a process for the heat treatment of a maraging steel with improved machinability, which process produces an object that is through-hardened even with a large cross-section.

2. Discussion of Background Information

Plastics are in many products of general and technical use, which plastic parts generally feature a certain shape and surface appearance. Shaping can be performed, for example, by compression molding, transfer molding, or injection molding, of material in parts of a mold. The surface appearance of the parts, which is important for the aesthetic judgement by the customer, is essentially determined by the surface quality of the mold used during shaping.

Objects or parts made of steel, in particular also made of martensitic steels, are usually used as molds for the shaping of plastic materials and also as clamping elements such as frames and the like. In the preparation of a steel of this type for this purpose, the interests of both the mold designer and the mold user are preferably taken into consideration.

For a short, cost-effective manufacture of plastic molds and associated parts, the mold designer wants to use as solid as possible workpieces of thermally tempered rod or flat material from stock, as a result of which, production costs can be reduced by the omission of the heat treatment, with simultaneously little waste. Moreover, with a manufacture from already tempered material, plastic molds or parts of particular dimensional accuracy can be made available to a mold user, since warping of a mold due to a thermal treatment subsequent to the mold manufacture is avoided.

For ease of machining and achievement of a satisfactory surface quality of the plastic parts, the mold designer requires that thermally tempered starting material have in particular good machinability. A complete through-hardening of the workpieces used is also required, so that uniform mechanical properties of the plastic molds manufactured from them can be achieved over the entire cross-section.

For economic reasons, in addition to good weldability, the corrosion resistance of the material represents an aspect of great importance to the mold user, for the cost-effective manufacture and, in particular, repair of molds. Only plastic molds and mold parts made of sufficiently corrosion-resistant steels are suitable for repeated use with intermediate storage times and/or in continuous operation. The surfaces of the molds are in regular contact with aggressive corrosion-causing chemicals, due to fillers but in particular due to impurities of the plastics, such as, for example, acids originating from an acid-catalyzed polymerization.

For the manufacture of plastic molds with comparatively high corrosion resistance, it is known to use steels with a chromium content of more than 12% by weight. Such steels are known by the alloys with DIN material numbers 1.2085, 1.2314, or 1.2316. Steels of this type, with a chromium content of at least 14.0% by weight, have a carbon content of 0.33% by weight and above, which high carbon contents, with a carbide formation, can effect a lowering of the chromium concentration in the matrix and thus a reduction in the corrosion resistance, in particular in the area surrounding the carbides.

In order to achieve better corrosion resistance, steels with a lowered carbon content are consistently used, such as, for example, a steel with the DIN material number 1.4005. A low-carbon martensitic steel is also proposed in U.S. Pat. No. 6,045,633, which is incorporated by reference herein in its entirety, for the manufacture of plastic molds. In addition to iron and impurities caused in manufacturing, such a steel contains, in by weight, 1.0–1.6% manganese, 0.25–1.0% silicon, 0.5–1.3% copper, 12.0–14.0% chromium, 0.06–0.3% sulfur, as well as farther elements. With this alloy, copper can increase the corrosion resistance in addition to lowering the carbon content. However, copper contents at this level can cause considerable problems during hot forming of workpieces, and in particular can cause a formation of fine cracks on the surface of the machined workpieces, which cracks can again promote crevice corrosion.

The known steels for plastic molds and the like parts can fully meet the manifold needs of mold designers and mold users as far as the mechanical and corrosion-chemical properties are concerned, but a frequently inadequate machinability is observed with materials of this type. Furthermore, it has also proved that a through-hardening of workpieces made of these alloys is difficult to achieve during a thermal tempering, above all with solid objects with large cross-sections, such as, for example, forged rods that are advantageous from the point of view of manufacturing technology. Nonuniform mechanical properties of the molds produced from such workpieces may result from this, causing weak points that become evident primarily through premature material failure.

SUMMARY OF THE INVENTION

The present invention relates to the production of maraging steel, which steel simultaneously has good weldability, high corrosion resistance, and improved machinability.

The present invention also relates to a process for the heat treatment of a maraging steel with improved machinability, which process provides an object that is through-hardened even in the case of a large cross-section.

It is also a goal of the invention to present uses of a steel according to the invention.

The invention relates to a maraging steel with improved machinability, good weldability, and high corrosion resistance, containing (in % by weight)

0.02–0.075% carbon;
0.1–0.6% silicon;
0.5–0.95% manganese;
0.08–0.25% sulfur;
phosphorus present up to a maximum of 0.04%;
12.4–15.2% chromium;
0.05–1.0% molybdenum;
0.2–1.8% nickel;
vanadium present up to a maximum of 0.15%;
0.1–0.45% copper;
aluminum present up to a maximum of 0.03%;
0.02–0.08% nitrogen; and residual iron, and impurities caused in manufacturing, which steel has a ferrite percentage of less than 28% by volume.

The present invention also relates to a process for heat treatment of a maraging steel with improved machinability, which process produces an object that is through-hardened even with a large cross-section, comprising subjecting a steel block with a composition (in % by weight) of
0.02–0.075% carbon;
0.1–0.6% silicon;
0.5–0.95% manganese;
0.08–0.25% sulfur;
phosphorus present up to a maximum of 0.04%;
12.4–15.2% chromium;
0.05–1.0% molybdenum;
0.2–1.8% nickel;
vanadium present up to a maximum of 0.15%;
0.1–0.45% copper;
aluminum present up to a maximum of 0.03%;
0.02–0.08% nitrogen; and
residual iron, and impurities caused in manufacturing,
to an annealing treatment for formation and adjustment of a ferrite percentage in the steel;
thereafter hot forming with an at least 4-fold degree of deformation;
thereafter soft annealing; and
thermal tempering with at least one hardness treatment and at least one draw treatment.

The steel can include at least one additional alloying element up to a maximum of 2.0% by weight.

The steel can contain 0.80–0.90% by weight manganese and 0.10–0.16% by weight sulfur.

The steel can contain 13.8–15.0% by weight chromium, preferably 14.1–14.7% by weight chromium. The steel can contain 0.25–1.6% nickel, more preferably 0.35–1.1% by weight nickel; and even more preferably 0.8–1.0% by weight nickel. The steel can contain 0.25–0.35% by weight copper.

The steel can have a ferrite percentage of up to 15% by volume, up to 10% by volume, or up to 6% by volume.

The annealing treatment for the formation and adjustment of a ferrite percentage can be performed between 1080° C. and 1350° C. for at least 12 hours, preferably 24 hours. The annealing treatment can provide a ferrite content up to a maximum of 28% by volume, up to a maximum of 15% by volume, up to a maximum of 10% by volume, or up to a maximum of 6% by volume.

The steel can contain (in % by weight) at least one of 13.8–15.0%, preferably 14.1–14.7% chromium, and 0.25–1.6%, preferably 0.35–1.1%, and more preferably 0.8–1.0% nickel.

The present invention also relates to a frame construction for plastic molds comprising the steel according to the present invention.

The present invention also relates to a forged piece with a thickness of at least 0.32 m and a cross-sectional area of at least 0.1 m$^2$, heat-treated according to the process according to the present invention.

The present invention also relates to a mold part fabricated by machining, the mold part comprising a steel the present invention.

The present invention also relates to a mold part fabricated by machining, the mold part comprising a steel produced by the process according to the present invention.

BRIEF DESCRIPTION OF THE DRAWINGS

The present invention is further described in the detailed description which follows by way of non-limiting examples of exemplary embodiments of the present invention, wherein.

DETAILED DESCRIPTION OF THE PRESENT INVENTION

Figure 1:
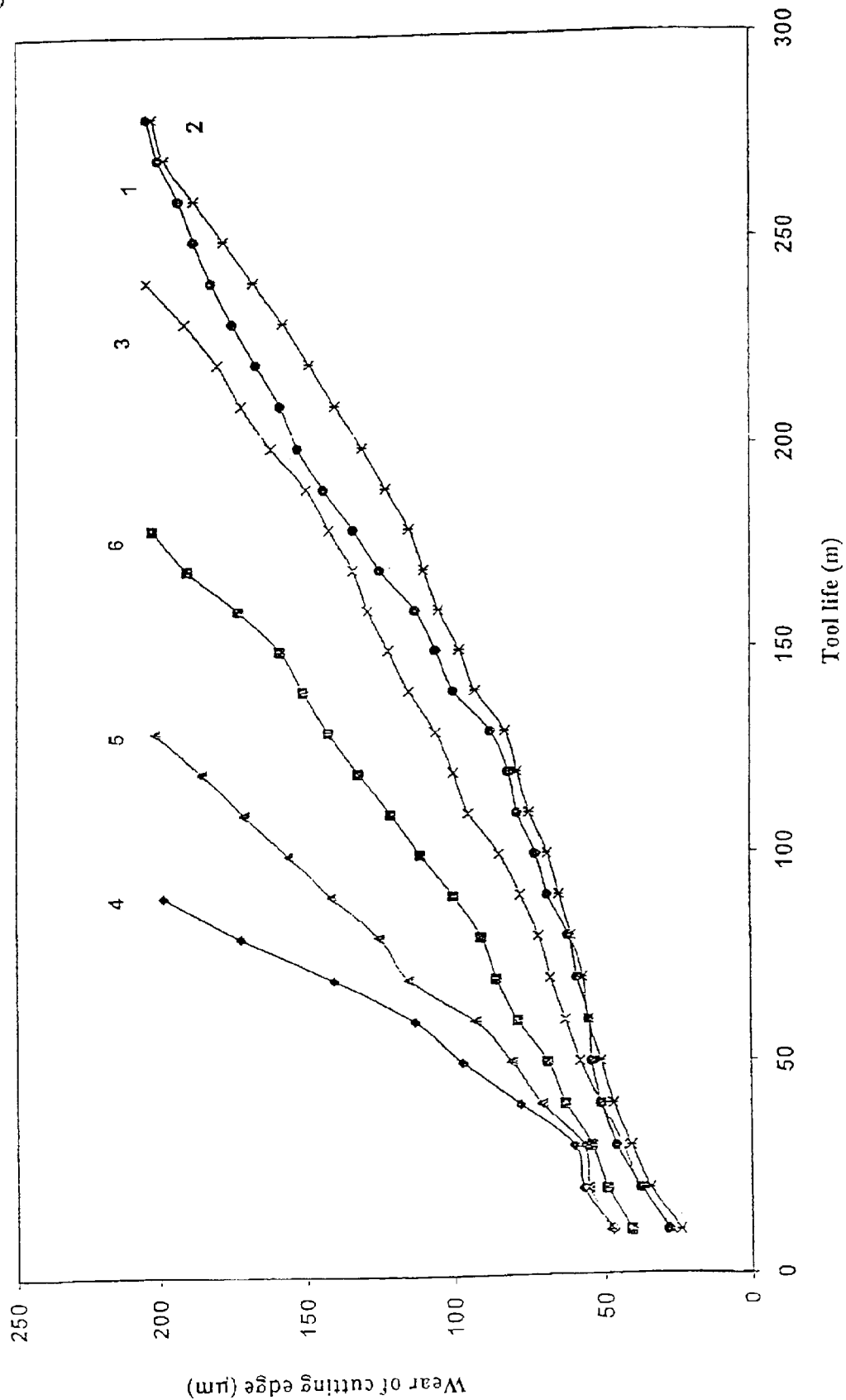
FIG. 1 shows a diagram of the wear of the cutting edge of the tool depending on the tool life travel for workpieces made of a steel according to the invention (labeled 1–3), as well as comparison steels (labeled 4–6).

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A maraging steel with improved machinability, good weldability, and high corrosion resistance is achieved by providing a maraging steel containing, in % by weight:
0.02–0.075% carbon
0.1–0.6% silicon
0.5–0.95% manganese
0.08–0.25% sulfur
maximum 0.04% phosphorus
12.4–15.2% chromium
0.05–1.0% molybdenum
0.2–1.8% nickel
maximum 0.15% vanadium
0.1–0.45% copper
maximum 0.03% aluminum
0.02–0.08% nitrogen,
As well as optionally one or more additional alloying elements up to a maximum of 2.0%, residual iron, and impurities caused in manufacturing, which steel has a ferrite percentage in the structure of less than 28% by volume.

The advantages of the invention are to be seen in particular in that by utilizing appropriate technical alloying measures, a maraging steel is made that has synergetically a ferrite percentage in the structure that can be adjusted as desired by use of heat treatment, and thus an improved machinability, but simultaneously ensures a high corrosion resistance and good weldability with a carbon content of 0.02–0.075% by weight and a chromium content of 12.4–15.2% by weight. A nickel content of 0.2–1.8% by weight is provided according to the invention, which on the one hand is used to adjust the percentage of ferrite in the structure. On the other hand a resistance to reducing chemicals is achieved by nickel combined with chromium, as a result of which a steel according to the invention attains a high chemical resistance.

To form manganese sulfides in the material that promote the machinability, manganese contents of 0.5–0.95% by weight and sulfur contents of 0.08–0.25% by weight are essential for the invention, whereby the ratio of the contents of manganese and sulfur must be coordinated so that an advantageous machinability is achieved with simultaneously good corrosion resistance. Indications were found that manganese contents lower than 0.5% by weight can cause a tendency to form chromium sulfides, which chromium sulfides have a detrimental effect on the machinability. In contrast, manganese contents higher than 0.95% by weight regularly resulted in a formation of chromium-free manganese sulfides. Calcium up to maximum 0.01% by weight can produce a favorable isotropic morphology of the manganese sulfide inclusions.

Copper is provided in the range of 0.1–0.45% by weight, which copper contents help to increase the corrosion resistance. An upper limit of the copper content is given at 0.45% by weight thereby, up to which limit a good hot formability of workpieces, in particular large forged pieces, made of a steel according to the invention can be achieved.

Molybdenum with a content of 0.05 to 1.0% by weight serves to maintain the desired conversion kinetics to increase hardness during the formation of martensite and in the prescribed concentration range has also proved to be favorable for largely suppressing a chromium carbide formation and the corrosion resistance. Molybdenum contents higher than 1.0% by weight, in contrast, lower the crack resistance during hot forming processes of workpieces in some temperature ranges.

Further elements of a steel according to the invention are provided with carbon, silicon, phosphorus, vanadium, aluminum, and nitrogen with the percentages by weight, including 0.02–0.075% carbon; 0.1–0.6% silicon; maximum 0.04% phosphorus; maximum 0.15% vanadium; maximum 0.03% aluminum; and 0.02–0.08% nitrogen.

Alloying constituents, such as in particular also transition metals of Groups 5 and 6 of the Periodic Table, can be present with a total percentage of up to 2% by weight without an observable detrimental effect on machinability and can optionally be used to raise the corrosion resistance.

Steels according to a preferred embodiment of the present invention include 0.80–0.90% by weight manganese and 0.10–0.16% by weight sulfur. In this composition range, good corrosion resistance with particularly improved machinability is achieved with an Mn/S weight ratio of 5.0 to 9.0, which effect can be attributed to the influence of a spherical morphology of the manganese sulfide particles in the embodiment in question.

Formation of slightly chromium-containing manganese sulfide particles also seems to be promoted at a stoichiometric Mn/S ratio <3:1, as a result of which the material can achieve advantageous corrosion properties.

With higher chromium contents, the corrosion resistance of alloys improves considerably, while their machinability is slightly reduced. A steel according to the invention advantageously has 13.8–15.0%, preferably 14.1–14.7%, chromium, in which composition ranges the desired advantageous properties can be achieved simultaneously.

As far as good corrosion properties as well as an exact adjustment of the ferrite percentage and improved machining properties are concerned, it is preferred that a steel according to the invention is alloyed with nickel in contents of 0.25–1.6% by weight, preferably 0.35–1.1% by weight, and in particular 0.8–1.0% by weight. Higher nickel concentrations generally stabilize austenite disadvantageously at higher temperatures, whereas lower nickel contents have an unfavorable effect on the conversion behavior of the material during thermal tempering.

A copper content of 0.25–0.35% by weight has proved advantageous in the optimization of the material properties. In this range of the copper concentration, the improvement of the general corrosion resistance effected by this alloying element in hot formed objects amounts to a maximum, whereby an increasing tendency towards crevice corrosion at higher copper contents can be explained by a formation of fine surface cracks.

A good machinability of the material according to the invention is achieved at a ferrite percentage in the structure of up to 15% by volume. Advantageously, however, ferrite percentages of up to 10% by volume and up to 6% by volume with only slightly lower machinability can also be provided, as a result of which the mechanical properties of a mold part are raised, in particular transverse to the direction of shaping.

The further object of indicating a process for the heat treatment of a maraging steel with improved machinability, which process produces an object that is through-hardened even with a large cross-section, is achieved in that a steel block with a composition (in % by weight) of 0.02–0.075% carbon
0.1–0.6% silicon
0.5–0.95% manganese
0.08–0.25% sulfur
maximum 0.04% phosphorus
12.4–15.2% chromium
0.05–1.0% molybdenum
0.2–1.8% nickel
maximum 0.15% vanadium
0.1–0.45% copper
maximum 0.03% aluminum
0.02–0.08% nitrogen as well as optionally additional alloying elements totaling up to a maximum of 2.0%, residual iron, and impurities caused in manufacturing, is subjected in a first step to an annealing treatment for the formation and adjustment of a ferrite percentage in the structure and in a second step a hot forming with an at least 4-fold degree of deformation of the same takes place, after which in a third step a soft annealing of the forged piece and then a thermal tempering consisting of at least one hardness treatment and at least one draw treatment are carried out.

The advantages of a process according to the invention are to be seen in that a heat-treated metallic object can be produced that has a completely hard structure throughout, even with large cross-sections, which is why plastic mold parts with uniform mechanical properties and high quality can be manufactured from such workpieces. The advantageous through-hardening can be ascribed thereby primarily to the effect of nickel combined with further alloying elements.

In the process according to the invention it is possible to adjust the ferrite content in the structure within wide ranges and thus to influence the machinability of workpieces.

At a nickel content provided for at 0.2–1.8% by weight, according to the invention, in a specific manner, a ferrite percentage in the structure of 0 to 70% by volume can be adjusted respectively by a selection of the annealing temperature and time. With an adequate annealing time, the ferrite percentage follows, for example, the empirical equations below, depending on the nickel content:

$$0.5\% \text{ nickel: Ferrite percentage (\% by volume)} = 0.345 \times \text{annealing treatment temperature (°C.)} - 370 \quad (1)$$

$$1.0\% \text{ nickel: Ferrite percentage (\% by volume)} = 0.355 \times \text{annealing treatment temperature (°C.)} - 390 \quad (2)$$

$$1.5\% \text{ nickel: Ferrite percentage (\% by volume)} = 0.375 \times \text{annealing treatment temperature (°C.)} - 430 \quad (3)$$

Even with a pre-determined annealing treatment temperature, the ferrite percentage in the structure can be adjusted in a simple manner by changing the nickel content in the steel.

If, as has proved to be advantageous, the annealing treatment is carried out between 1080° C. and 1350° C. and for at least 12 hours, preferably for at least 24 hours, an exact adjustment of the ferrite amount can be ensured with a favorable stability as far as the further processing of the material is concerned.

In a further advantageous embodiment of the process according to the invention, the ferrite percentage in the structure (in % by volume) is set at up to 15%, preferably up to 10%, and in particular up to 6% by volume using an annealing treatment, as a result of which a desirably good machinability of the workpieces is achieved at the same time as good strength properties.

It was found that the ferrite content of a workpiece made according to the invention can be adjusted with particular precision if the steel (in % by weight) contains 13.8–15.0%, preferably 14.1–14.7%, chromium and/or 0.25–1.6%, preferably 0.35–1.1%, and in particular 0.8–1.0%, nickel, whereby in this content range of chromium and nickel, workpieces can be made with a corrosion resistance exceeding prior art.

If, as has been shown, the steel contains 0.25 to 0.35% by weight copper, the corrosion resistance of the material will be particularly improved. Copper concentrations of over 0.35% by weight, however, can cause disadvantages in a hot forming of the material and a reduced surface quality of the part. Furthermore, the tendency to crevice corrosion of the material can be increased by copper contents higher than 0.35% by weight.

The use of a steel according to the invention has proved to be particularly advantageous and cost-effective when used for frame constructions for plastic molds. Due to its improved machinability, high corrosion resistance, and good weldability, such a steel is suitable for the cost-effective manufacture of such mold parts, which stand out in use for a high chemical resistance and long life. The use of forged pieces made of the alloy according to the invention has proved particularly favorable for making the molds or parts, in particular with respect to the greatest cost-effectiveness.

EXAMPLES

The invention is explained in more detail in the following on the basis of several exemplary embodiments.

Workpieces manufactured according to the invention and comparison workpieces with chemical compositions according to Table 1 were used for testing the material properties. The chemical compositions of workpieces 1 to 3 each concern a steel according to the invention, those labeled 4 to 6 concern comparison steels known from the prior art.

TABLE 1

Chemical composition of tested workpieces in % by weight
(with the exception of impurities caused in manufacturing)
Composition (% by weight)

| Element | Workpiece 1 | Workpiece 2 | Workpiece 3 | Workpiece 4 | Workpiece 5 | Workpiece 6 |
|---|---|---|---|---|---|---|
| C | 0.05 | 0.04 | 0.06 | 0.34 | 0.08 | 0.05 |
| Mn | 0.8 | 0.70 | 0.86 | 1.40 | 0.80 | 1.35 |
| Si | 0.34 | 0.43 | 0.37 | 0.35 | 0.45 | 0.48 |
| S | 0.24 | 0.1 | 0.14 | 0.12 | 0.18 | 0.22 |
| P | 0.02 | 0.01 | 0.01 | 0.02 | 0.02 | 0.02 |
| Cr | 13.9 | 12.5 | 14.5 | 16.0 | 12.8 | 12.6 |
| Ni | 0.63 | 0.4 | 0.95 | 0.65 | | |
| Cu | 0.15 | 0.25 | 0.34 | | | 0.95 |
| Mo | 0.1 | 0.25 | 0.92 | 0.15 | | |
| V | 0.06 | 0.03 | 0.09 | | | 0.08 |
| Al | 0.03 | 0.02 | 0.02 | 0.04 | 0.04 | 0.04 |
| N | 0.04 | 0.05 | 0.05 | 0.05 | 0.05 | 0.04 |
| Residue | Fe | Fe | Fe | Fe | Fe | Fe |

The workpieces were subjected to a heat treatment, which heat treatment in a first step consisting of a 15-hour annealing treatment between 1080° C. and 1350° C., whereby with workpieces according to the invention a desired ferrite content was established at a given nickel content via the temperature. In a second step, the workpieces were each forged at about 1000° C. with a 6-fold degree of deformation and were then subjected to a soft annealing at 590° C. Finally, a thermal tempering took place, including a hardening of 1020° C. and a drawing in the area of 530° C. The workpieces were tested for their through-hardening. Furthermore, the machinability and the corrosion resistance were tested.

The through-hardening of the workpieces was evaluated quantitatively on the cross-section of the workpieces by means of five hardness measurements along the horizontal axis of the cross-section. The differences in hardness with reference to the greatest hardness value were each within maximum of ±5% for workpieces made according to the invention, whereas the comparison workpieces 4, 5 or 6 feature differences of hardness of ±10% and more.

To determine the machinability, a torus cutter tipped with carbide indexable inserts was used, whereby the cutting parameters were given as follows:
Cutting speed: 350 mmin$^{-1}$
Advance/tooth: 0.3 mm The improvement achieved by the invention is shown by FIG. 1, from which a distinctly increased tool life with the machining of a steel according to the invention can be seen.

Workpieces with the same chemical composition, made by a process according to the invention with a ferrite percentage in the structure of up to about 5% proved to be more readily machinable.

A test of the corrosion resistance was undertaken in a first test series using a salt spray test according to DIN 50021, whereby the percentage of corroded area was ascertained after a treatment time of 2 hours and 5 hours. The sample size of the tested workpieces was 36 cm$^2$.

TABLE 2

Corrosion resistance of tested workpieces according to DIN 50021
Percentage of corroded area (%)

| Spray duration (h) | Workpiece 1 | Workpiece 2 | Workpiece 3 | Workpiece 4 | Workpiece 5 | Workpiece 6 |
|---|---|---|---|---|---|---|
| 2 | 28 | 33 | 32 | 35 | 50 | 37 |
| 5 | 57 | 61 | 63 | 68 | 71 | 69 |

A welding of mold parts made of a steel according to the invention presented no problems.

Further tests with a steel according to the invention, which steel additionally had further alloying elements up to about 1.5% by weight, predominantly metals of Groups 5 and 6 of the Periodic Table, showed similar results.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

We claim:

1. Maraging steel with improved machinability, good weldability, and high corrosionresistance, containing (in % by weight)
   0.02–0.075% carbon;
   0.1–0.6% silicon;
   0.5–0.95% manganese;
   0.08–0.25% sulfur;
   phosphorus present up to a maximum of 0.04%;
   12.4–15.2% chromium;
   0.05–1.0% molybdenum;
   0.2–1.8% nickel;
   vanadium present up to a maximum of 0.15%;
   0.1–0.45% copper;
   aluminum present up to a maximum of 0.03%;
   0.02–0.08% nitrogen; and
   residual iron, and impurities caused in manufacturing, which steel has a ferrite percentage of less than 10% by volume, wherein said maraged steel has been subjected to an annealing treatment for formation and ajustment of the ferrite percentage in the steel, thereafter hot formed with an at least 4-fold degree of deformation, thereafter soft annealed, and thermally tempered with at least one hardness treatment and at least one draw treatment.

2. The steel according to claim 1 further including at least one additional alloying element up to a maximum of 2.0% by weight.

3. The steel according to claim 1 containing 0.80–0.90% manganese and 0.10–0.16% sulfur.

4. The steel according to claim 1 containing 13.8–15.0% chromium.

5. The steel according to claim 1 containing 14.1–14.7% chromium.

6. The steel according to claim 1 containing 0.35–1.1% nickel.

7. The steel according to claim 4 containing 0.35–1.1% nickel.

8. The steel according to claim 1 containing 0.8–1.0% nickel.

9. The steel according to claim 4 containing 0.8–1.0% nickel.

10. The steel according to claim 1 containing 0.25–0.35% copper.

11. The steel according to claim 9 containing 0.25–0.35% copper.

12. The steel according to claim 7 containing 0.25–0.35% copper.

13. The steel according to claim 9 containing 0.25–0.35% copper.

14. The steel according to claim 1 comprising a ferrite percentage of up to 6% by volume.

15. A process for heat treatment of a maraging steel with improved machinability, which process produces an object that is through-hardened even with a large cross-section, comprising subjecting a steel block with a composition (in % by weight) of
    0.02–0.075% carbon;
    0.1–0.6% silicon;
    0.5–0.95% manganese;
    0.08–0.25% sulfur;
    phosphorus present up to a maximum of 0.04%;
    12.4–15.2% chromium;
    0.05–1.0% molybdenum;
    0.2–1.8% nickel;
    vanadium present up to a maximum of 0.15%;
    0.1–0.45% copper;
    aluminum present up to a maximum of 0.03%;
    0.02–0.08% nitrogen; and
    residual iron, and impurities caused in manufacturing,
    to an annealing treatment for formation and adjustment of a ferrite percentage in the steel, the annealing treatment for the formation and adjustment of a ferrite percentage being performed between 1080° C. and 1350° C. for at least 12 hours;
    thereafter hot forming with an at least 4-fold degree of deformation;
    thereafter soft annealing; and
    thermal tempering with at least one hardness treatment and at least one draw treatment.

16. The process according to claim 1 wherein the annealing treatment is performed for at least 24 hours.

17. The process according to claim 15 wherein the annealing treatment provides a ferrite content up to a maximum of 28% by volume.

18. The process according to claim 15 wherein the annealing treatment provides a ferrite content up to a maximum of 15% by volume.

19. The process according to claim 15 wherein the annealing treatment provides a ferrite content up to a maximum of 10% by volume.

20. The process according to claim 15 wherein the annealing treatment provides a ferrite content up to a maximum of 6% by volume.

21. The process according to claim 15 wherein the steel (in % by weight) contains at least one of 13.8–15.0% chromium and 0.25–1.6% nickel.

22. The process according to claim 21 wherein the steel (in % by weight) contains 14.1–14.7% chromium.

23. The process according to claim 21 wherein the steel (in % by weight) contains 0.35–1.1% nickel.

24. The process according to claim 21 wherein the steel (in % by weight) contains 0.8–1.0%, nickel.

25. The process according to claim 22 wherein the steel (in % by weight) contains 0.35–1.1% nickel.

26. The process according to claim 22 wherein the steel (in % by weight) contains 0.8–1.0%, nickel.

27. The process according to claim 15 wherein the steel contains 0.25–0.35% by weight copper.

28. The process according to claim 15 wherein the steel includes at least one additional alloying element up to a maximum of 2.0% by weight.

29. A frame construction for plastic molds comprising the steel according to claim 1.

30. A forged piece with a thickness of at least 0.32 m and a cross-sectional area of at least 0.1 m$^2$, heat-treated according to the process recited in claim 15.

31. A mold part fabricated by machining, said mold part comprising a steel according to claim 1.

32. A mold part fabricated by machining, said mold part comprising a steel produced by the process recited in claim 15.

* * * * *